United States Patent
Ben Amor

(10) Patent No.: US 9,770,762 B2
(45) Date of Patent: Sep. 26, 2017

(54) MINIATURIZED CUTTING PLATE

(71) Applicant: Raouf Ben Amor, Lorch (DE)

(72) Inventor: Raouf Ben Amor, Lorch (DE)

(*) Notice: Subject to any disclaimer, the term of this patent is extended or adjusted under 35 U.S.C. 154(b) by 229 days.

(21) Appl. No.: 14/348,632

(22) PCT Filed: Oct. 5, 2012

(86) PCT No.: PCT/EP2012/069705
§ 371 (c)(1),
(2) Date: Mar. 31, 2014

(87) PCT Pub. No.: WO2013/050520
PCT Pub. Date: Apr. 11, 2013

(65) Prior Publication Data
US 2014/0234041 A1 Aug. 21, 2014

(30) Foreign Application Priority Data
Oct. 6, 2011 (DE) .................. 10 2011 084 091

(51) Int. Cl.
*B23B 27/16* (2006.01)
*B23B 27/22* (2006.01)
*B23B 29/00* (2006.01)

(52) U.S. Cl.
CPC ...... *B23B 27/1625* (2013.01); *B23B 27/1651* (2013.01); *B23B 27/16* (2013.01); *B23B 27/22* (2013.01); *B23B 29/00* (2013.01); *B23B 2200/088* (2013.01); *B23B 2226/125* (2013.01); *Y10T 407/2272* (2015.01); *Y10T 407/2282* (2015.01)

(58) Field of Classification Search
CPC ............... Y10T 407/11; Y10T 407/112; Y10T 407/114; Y10T 407/116; Y10T 407/118; Y10T 407/2268; Y10T 407/228; Y10T 407/2282; Y10T 407/24; B23B 2200/088; B23B 2226/125; B23B 27/1625; B23B 27/1651
USPC .................................. 407/2–6, 100, 107, 115
See application file for complete search history.

(56) References Cited

U.S. PATENT DOCUMENTS 5,658,100 A * 8/1997 Deiss ...................... B23C 5/109
407/104
5,820,311 A * 10/1998 Grun ................... B23B 27/1677
407/102

(Continued)

FOREIGN PATENT DOCUMENTS

DE         4240295 A1     6/1993
DE     198 54 873 A1     5/2000

(Continued)

*Primary Examiner* — Sunil K Singh
*Assistant Examiner* — Nicole N Ramos
(74) *Attorney, Agent, or Firm* — Norton Rose Fulbright US LLP; James R. Crawford

(57) ABSTRACT

The invention relates to a cutting plate for a chip-removing cutting tool, comprising a cutting plate top face and a cutting plate bottom face, one or more lateral faces, cutting edges at the transition between the cutting plate top face and the one or more lateral face, and a circular chip recess in the cutting plate top face that has an outside diameter d1. In order to reduce the production costs, according to the invention the following applies to the outside diameter d1 of the chip recess: 2 mm<d1<=6 mm, preferably 2 mm<d1<5 mm.

15 Claims, 1 Drawing Sheet

(56) References Cited

U.S. PATENT DOCUMENTS

| | | | | |
|---|---|---|---|---|
| 6,017,172 A | * | 1/2000 | Ukegawa | B23B 27/1651 407/113 |
| 6,379,087 B1 | * | 4/2002 | Alexander, IV | B23B 27/1651 407/105 |
| 6,394,709 B1 | * | 5/2002 | Sjoo | B23B 27/1633 407/105 |
| 6,609,859 B1 | * | 8/2003 | Sjoo | B23B 27/1651 104/113 |
| 7,320,563 B2 | * | 1/2008 | Muller | B23B 27/164 407/102 |
| 7,381,016 B2 | * | 6/2008 | Oles | B23B 27/065 228/254 |
| 8,388,273 B2 | | 3/2013 | Eder et al. | |
| 2003/0086766 A1 | * | 5/2003 | Andras | B23B 27/1651 407/102 |
| 2004/0256608 A1 | | 12/2004 | Eder et al. | |
| 2005/0186039 A1 | * | 8/2005 | Muller | B23B 27/164 407/113 |
| 2007/0160432 A1 | * | 7/2007 | Eder | B23B 27/1629 407/113 |
| 2008/0253848 A1 | * | 10/2008 | Alm | B23B 27/1622 407/114 |
| 2010/0129168 A1 | * | 5/2010 | Waki | C23C 14/0641 407/119 |
| 2012/0195702 A1 | | 8/2012 | Eder et al. | |

FOREIGN PATENT DOCUMENTS

| | | |
|---|---|---|
| EP | 1 414 607 B1 | 4/2008 |
| EP | 1 995 007 A1 | 11/2008 |

* cited by examiner

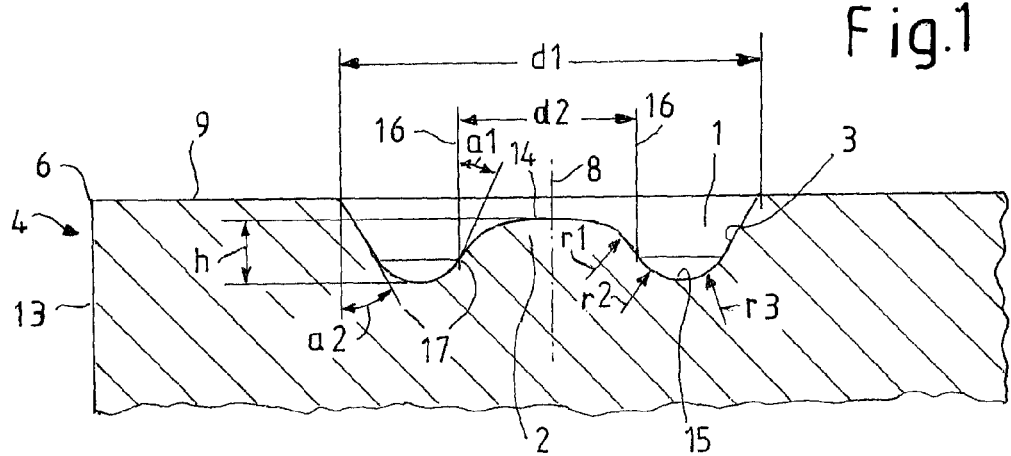
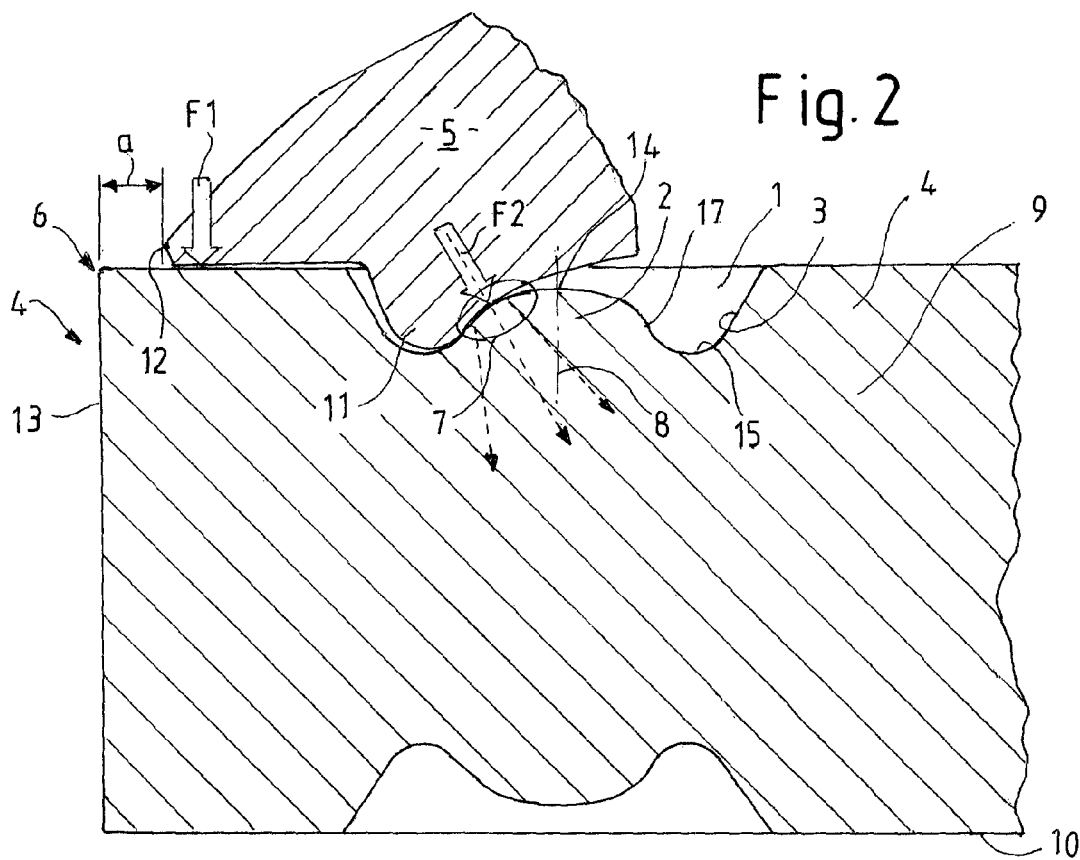
 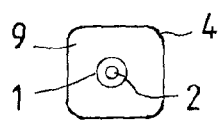 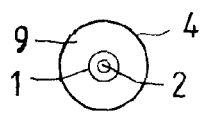

MINIATURIZED CUTTING PLATE

This application is a §371 of International Application No. PCT/EP2012/069705 filed Oct. 5, 2012, and claims priority from German Patent Application No. 10 2011 084 091.5 filed Oct. 6, 2011.

The invention relates to a cutting plate for a chip-removing cutting tool, having a top side of the cutting plate and a bottom side of the cutting plate, one or more side faces, cutting edges at the transition from the top side of the cutting plate to the side face(s) and a circular clamping trough in the top side of the cutting plate, with an outside diameter $d1$.

Such a cutting plate, which is also known as a replaceable cutting insert, is described in EP 1 414 607 B1. These cutting plates are used for a chip-removing cutting tool consisting essentially of a support tool, which has a plate seat to receive the cutting plate. The cutting plate is held by a clamping claw with a cam in the support tool, wherein the clamping claw is secured on the support tool by a clamping bolt. The clamping claw is provided with a cam, which engages in the clamping trough and anchors the cutting plate either directly or by way of a pressure piece on the bottom side facing the cutting plate. The clamping trough has a circular shape with a nub in the center, where the tip of the nub is arranged above the bottom of the trough and below the top side of the cutting plate/bottom side of the cutting plate.

Cutting plates made of extremely brittle cutting materials are preferably secured in the support tool by means of the so-called trough tension described above. This makes it possible to avoid punching stresses, which are usually associated with a weakening of the cross section. This weakening can result in breakage of the cutting plate under a corresponding load.

In the case of PcBN cutting plates (polycrystalline cubic boron nitride) in a solid embodiment, the volume of the cutting plates is especially important for the manufacturing costs. Small cutting plates mean a definite cost reduction and thus an increase in profitability. PcBN belongs to the family of ceramic cutting materials with a limited toughness. The operation of cutting holes in smaller cutting plates usually entails a sacrifice in terms of process reliability, resulting in frequent cutting plate breakage. In certain machining operations, such as, for example, hard turning of gear parts and bearing parts, both ceramic cutting materials and PcBN cutting materials may be used. There are no known form-fitting trough clamping systems that offer a reliable exchangeability of cutting plates made of the aforementioned cutting materials. Secure anchoring of the cutting plates in the plate seat is a fundamental prerequisite for secure functionality of the tool systems. In the design of the clamping trough for tool systems, which ensure interchangeability, attention must be paid to the pressibility of the trough into the ceramic as well as a minimum of volume, which must be removed from the extremely hard PcBN in a complex procedure. PcBN is polycrystalline cubic boron nitride.

The object of the present invention is to improve upon a cutting plate according to the preamble of claim 1, so that its manufacturing costs are reduced.

This object is achieved according to the present invention by a miniaturized cutting plate. According to the invention, this object is achieved by the fact that the outside diameter $d1$ of the clamping trough is 2 mm<$d1$≤6 mm, preferably 2 mm<$d1$<5 mm. It has surprisingly been found that cutting plates with such small clamping troughs can be clamped reliably and securely in a tool and are not pulled out of the plate seat during machining. Cutting plates with these small clamping troughs can be manufactured on a small scale because the tension occurs above the clamping trough. Smaller cutting plates necessitate less material, so that manufacturing costs are minimized.

To improve the clamping effect, an interior circular nub is arranged in the clamping trough, such that the tip of the nub is situated above the bottom of the clamping trough and below the top side of the cutting plate, where the nub has an outside diameter $d2$ and a height h from the bottom of the clamping trough to the tip of the nub, the diameter $d2$ being measured at half height h of the nub with 0.8 mm<$d2$<3.5 mm for the diameter $d2$ of the nub. Clamping is optimized with these nubs and their size in relation to the size of the clamping trough.

The cutting plate preferably has the same clamping trough on the bottom side of the cutting plate as on its top side of the cutting plate and is thus a replaceable cutting insert.

In a preferred embodiment, the cutting plate is made of PcBN (polycrystalline cubic boron nitride). This is an extremely expensive material, so that smaller cutting plates permit a definite cost reduction.

In a preferred embodiment, the clamping trough has a volume V of V<8 mm$^3$, preferably V<6 mm$^3$. The volume of clamping troughs according to the state of the art as described in EP 1 414 607 B1, for example, is many times greater.

To prevent slippage of the cam of a clamping claw over the cam in the clamped state of the cutting plate, and to increase pressibility, the tip of the nub preferably develops into the bottom of the clamping trough by way of a flank inclined to the perpendicular to the top side of the cutting plate at a nub angle $\alpha 1$, such that the following holds for the nub angle $\alpha 1$: $7° < \alpha 1 < 55°$ and preferably $7° < \alpha 1 < 35°$.

In a special case, the nub angle $\alpha 1$ was selected as follows: $27° < \alpha 1 < 28°$. Slippage of the cam of the clamping claw over the nub did not occur in any application case.

The pressibility is definitely improved with all these angles in comparison with $\alpha 1 < 7°$. Known stresses according to the state of the art over a centrally arranged nub are much shallower. According to the state of the art, the angle $\alpha 1$ is $\alpha 1 \gg 45°$, i.e., it is usually 60° or more. With such shallow elevations, the pressibility is optimal but the attachment effect and thus the secured retraction and also the securing of the cutting plate against movements in the μm range during use are not provided. The nub 11 of the clamping claw 5 can also glide over the flat nub.

Since the nub is a supporting element, which has a very small diameter $d2$ because of the lack of space, the geometric design must be such that the stiffness is sufficient for transferring the force F1. In particular the ratio of diameter $d2$ to height (see FIG. 1) must be adapted to requirements. The following relationship: $2 \times d2 \geq h \geq 0.4 \times d2$ preferably holds for the height h of the nub, i.e., the distance from the ground to the tip of the nub.

The tip of the nub preferably develops into the flank via a transition radius r1, and the flank develops into the bottom of the clamping trough via a transition radius r2, and the bottom of the chip radius develops into the side flank via a transition radius r3, connecting the bottom of the clamping trough to the top side/bottom side of the cutting plate, where the radii r1, r2, r3 are between 0.05 mm and 0.6 mm, preferably between 0.2 mm and 0.3 mm.

This is advantageous in order to increase the strength. The transition radii r1, r2, r3 must achieve a certain size because otherwise rated breaking points are formed. The radius r1 in particular is to be selected so that a clamping surface may be formed between the cam on the clamping claw and the nub in the clamping trough. A clamping line or even a clamping point would result in increased stresses. The radii r1 to r3 are therefore between 0.05 mm and 0.6 mm, preferably between 0.2 mm and 0.3 mm. It is thus possible to create a sufficiently great stiffness, which offers a sufficient strength in conjunction with the pressure surface of the cam of the clamping claw. The geometry is designed so that the brittle ceramic is under compressive stress.

One use of the cutting plate according to the invention as described here is for clamping with a clamping claw which rests on the top side/bottom side of the cutting plate in front of the clamping trough with a nose on the clamping claw, as seen from the cutting edge of the cutting plate and on which a cam that engages in the clamping trough is arranged.

In a preferred use, the distance "a" from the cutting edge to the nose of the clamping claw on cutting plates with an inscribed circle of 12.7 mm is at least 2.2 mm, and for cutting plates with an inscribed circle smaller than 12.7 mm, it is at least 1.3 mm.

The cutting plate is preferably used for machining hardened steel.

The terms used in this description will now be defined below:

The angle $\alpha 1$ describes the inclination of the flank of the nub to the perpendicular to the top side of the cutting plate.

The angle $\alpha 2$ describes the inclination of the clamping trough from the edge of the clamping trough to the bottom of the clamping trough, measured to the perpendicular to the surface of the cutting plate.

The letter h denotes the height of the nub from the bottom of the clamping trough to the highest point of the nub, i.e., to the tip of the nub.

R1 is the radius with which the head, i.e., the tip of the nub, develops into the flank of the nub (described by the angle $\alpha 1$).

R2 is the radius with which the flank of the nub (described by the angle $\alpha 1$) develops into the bottom of the clamping trough.

R3 is the radius with which the bottom of the clamping trough develops into the flank of the clamping trough, described by the angle $\alpha 2$.

The invention is described in greater detail below on the basis of two figures, each of which shows a cross section through a cutting plate according to the invention.

FIG. 1 shows a section through the center 8 of a cutting plate 4 according to the invention, and FIG. 2 shows the same cutting plate 4 in the installed state, i.e., in engagement by a clamping claw 5.

The smaller the cutting plate 4 (see FIGS. 1 and 2), the smaller is also the available space for the design of the clamping trough 1. The available space is further reduced when a distance "a" of the nose 12 of a clamping claw 5 from the cutting edge 6 is taken into account (see FIG. 2). In addition, in the case of high-precision components, movements of the cutting plate 4 in the μm range are not allowed. Secure anchoring requires a form-fitting connection of the cutting plate 4 to the clamping claw 5. When the tension face 7 is placed in front of the center 8 of the cutting plate 4, the risk of so-called beaking is reduced. Beaking means that the cam 11 (see FIG. 2) slips over the nub 2 on the clamping claw 5 when machining a workpiece. "In front of the center" in this context means that the cam 11 engages in the clamping trough 1 on the side of the clamping trough 1 facing the cutting edge 6. Due to a special design of the nub 2, this can be reduced according to the present invention. The nub 2 is also referred to as an elevation.

The subject matter of the invention is therefore a miniaturized cutting plate 4 with a clamping trough 1 according to the invention. The clamping trough 1 has a diameter d1 of d1≤6 mm (≤denotes "less than or equal to"), preferably between 2<d1<5 mm (see FIG. 1). To ensure secure clamping, the angle $\alpha 1$ of the nub 2 is selected to be $\alpha 1<55°$. The angle is preferably between $7°<\alpha 1<35°$. In the specific case of FIGS. 1, 2 the angle $27°<\alpha 1<28°$ was set. This prevents the cam 11 of the clamping claw 5 from slipping over the nub 2. The cam 11 on the clamping claw 5 engages with the force F2 (see FIG. 2). In the case of the ceramic, the pressibility is definitely improved in comparison with $\alpha 1<7°$. Known stresses according to the state of the art are definitely shallower over a centrally disposed elevation. The angle $\alpha 1$ according to the state of the art is $\alpha 1>>45°$ and amounts to 60° or more. With such shallow elevations, pressibility is optimal but the attachment effect and thus the secured retraction and also securing the cutting plate 4 against μm movements during use are not achieved. The cam 11 of the clamping claw 5 can also slide over the shallower elevation.

The volume to be removed is reduced due to the small diameter d1 of the clamping trough 1 according to the invention. When working with PcBN, such clamping troughs 1 are usually created by complex laser methods. In comparison with traditional clamping troughs 1, the volume can be reduced to more than 40% so that additional economic advantages are obtained. Since the nub 2 is a supporting element and has a very small diameter d2 because of the lack of space, the geometric design must be such that the stiffness is sufficient for a transfer of force F1. The ratio of the diameter d2 to the height h (see FIG. 1) in particular must be adapted to requirements. The d/h ratio may be up to 1 to 2. The ratio of d/h is preferably 1:1. In this specific case, the d/h ratio is 1:0.5. To increase the strength, the transition radii r1 to r3 (see FIG. 1) must achieve a certain size. Otherwise, rated breaking points are formed. The radius r1 in particular is to be selected so that a tension face 7 may be formed between the cam 5 on the clamping claw 5 and the nub 2. A tension line or even a tension point would result in increased stresses. The radii r1 to r3 are between 0.05 mm and 0.6 mm, preferably between 0.2 mm and 0.3 mm. Thus, a sufficiently great stiffness can be created, which offers adequate strength in conjunction with the decompressive area of the cam 11 of the clamping claw 5. The geometry is designed so that the brittle ceramic is subjected to compressive stress. It is possible in this way to reliably achieve a trough size d1=3 mm (here in this specific preferred case). Therefore, a supporting surface (cf. F1) of the nose 12 of the clamping claw 5 in front of the center 8 of the replaceable cutting insert is possible without having to accept a critical distance "a" from the cutting edge.

The volume V of the clamping trough 1 is preferably V<8 mm$^3$ and especially preferably V<6 mm$^3$.

FIGS. 3a, 3b and 3c show various embodiments of a cutting plate 4 according to the invention in a view from above. FIG. 3a shows a triangular cutting plate 4 with a circular clamping trough 1 and a nub 2 arranged in the clamping trough. FIG. 3b shows a square cutting plate 4 with a circular clamping trough 1 and a nub 2 arranged in the clamping trough. FIG. 3c shows a cylindrical cutting plate 4 with a circular clamping trough 1 and a nub 2 arranged in the clamping trough.

The invention claimed is:

1. A cutting plate for a chip-removing cutting tool, said cutting plate comprising:
    a top side;

a bottom side;
a side face;
a bottom side cutting edges at the transition from the top side of the cutting plate to side face; and
a circular clamping trough in the top side of the cutting plate;
said circular clamping trough having an outside diameter d1, wherein d1 is greater than 2 mm and is less than or equal to 6 mm,
wherein the clamping trough has an interior circular nub having a tip, wherein the tip of the nub is situated above the bottom of the clamping trough and below the top side of the cutting plate, and the nub has an outside diameter (d2) and a height h from the bottom of the clamping trough to the tip of the nub, and the diameter (d2) is measured at half height h of the nub, and the diameter (d2) of the nub is greater than 0.8 mm but less than 3.5 mm, and
wherein the tip of the nub develops into the bottom of the clamping trough by way of a flank that is inclined toward the perpendicular of the top side of the cutting plate at a nub angle α1, wherein the nub angle α1 is greater than 7° but less than 55°.

2. A cutting plate according to claim 1, wherein the outside diameter d1 is greater than 2 mm and less than 5 mm.

3. The cutting plate according to claim 1, wherein the cutting plate has the same clamping trough on the bottom side of the cutting plate as on the top side of the cutting plate and therefore is a replaceable cutting insert.

4. The cutting plate according to claim 1, wherein the cutting plate is made of polycrystalline cubic boron nitride (PcBN).

5. The cutting plate according to claim 1, wherein the nub angle α1 is greater than 7° but less than 35°.

6. The cutting plate according to claim 2, wherein the nub angle α1 is greater than 27° but less than 28°.

7. The cutting plate according to claim 1, wherein the height h of the nub, defined as the distance from the bottom to the tip of the nub, is less than or equal to 2×d2 and greater than or equal to 0.4×d2.

8. The cutting plate according to claim 1, wherein the tip of the nub develops into the flank by way of a transition radius r1, and the flank develops into the bottom of the clamping trough by way of a transition radius r2, and the bottom of the clamping trough extends over a transition radius r3 into a side flank, which connects the bottom of the clamping trough to the top side of the cutting plate, wherein the radii r1, r2, r3 are between 0.05 mm and 0.6 mm.

9. The cutting plate according to claim 8, wherein the radii r1, r2, r3 are between 2 mm and 0.3 mm.

10. A combination of the cutting plate according to claim 1 and a clamping claw on which a cam is arranged, wherein the cam is engaged with the clamping trough and wherein there is a nose on the clamping claw, resting on the top side or bottom side of the cutting plate in front of the clamping trough, as seen from a cutting edge of the cutting plate.

11. A combination according to claim 10, wherein a distance "a" from the cutting edge to the nose of the clamping claw is at least 2.2 mm for cutting plates having an inscribed circle of 12.7 mm and amounts to at most 1.3 mm for cutting plates with an inscribed circle smaller than 12.7 mm, at least 1.3 mm.

12. A method for machining hardened steel by contacting hardened steel with a cutting edge of the cutting plate according to claim 1.

13. The cutting plate according to claim 2, wherein the cutting plate is made of polycrystalline cubic boron nitride (PcBN).

14. The cutting plate according to claim 3, wherein the cutting plate is made of polycrystalline cubic boron nitride (PcBN).

15. The cutting plate according to claim 2, wherein the cutting plate has the same clamping trough on the bottom side of the cutting plate as on the top side of the cutting plate and therefore is a replaceable cutting insert.

* * * * *